(12) United States Patent
Simkins et al.

(10) Patent No.: US 9,081,634 B1
(45) Date of Patent: Jul. 14, 2015

(54) DIGITAL SIGNAL PROCESSING BLOCK

(71) Applicant: Xilinx, Inc., San Jose, CA (US)

(72) Inventors: James M. Simkins, Park City, UT (US); Wayne E. Wennekamp, San Jose, CA (US); John M. Thendean, Pleasanton, CA (US); Adam Elkins, San Jose, CA (US); Richard L. Walke, Edinburgh (GB)

(73) Assignee: XILINX, INC., San Jose, CA (US)

( * ) Notice: Subject to any disclaimer, the term of this patent is extended or adjusted under 35 U.S.C. 154(b) by 347 days.

(21) Appl. No.: 13/672,948

(22) Filed: Nov. 9, 2012

(51) Int. Cl.
*G06F 7/57* (2006.01)

(52) U.S. Cl.
CPC ........................................ *G06F 7/57* (2013.01)

(58) Field of Classification Search
CPC ...................................................... G06F 17/10
USPC ........................................................ 708/620
See application file for complete search history.

(56) References Cited

U.S. PATENT DOCUMENTS

| | | | |
|---|---|---|---|
| 6,690,667 B1 * | 2/2004 | Warren | ........................ 370/389 |
| 7,467,175 B2 | 12/2008 | Simkins et al. | |
| 7,467,177 B2 | 12/2008 | Simkins et al. | |
| 7,472,155 B2 | 12/2008 | Simkins et al. | |
| 7,480,690 B2 | 1/2009 | Simkins et al. | |
| 7,567,997 B2 | 7/2009 | Simkins et al. | |
| 7,840,627 B2 | 11/2010 | Simkins et al. | |
| 7,840,630 B2 | 11/2010 | Wong et al. | |
| 7,844,653 B2 | 11/2010 | Simkins et al. | |
| 7,849,119 B2 | 12/2010 | Vadi et al. | |
| 7,853,632 B2 | 12/2010 | Ching et al. | |
| 7,853,634 B2 | 12/2010 | Simkins et al. | |
| 7,853,636 B2 | 12/2010 | New et al. | |
| 7,860,915 B2 | 12/2010 | Vadi et al. | |
| 7,865,542 B2 | 1/2011 | New et al. | |
| 7,870,182 B2 | 1/2011 | Thendean et al. | |
| 7,882,165 B2 | 2/2011 | Simkins et al. | |
| 8,463,832 B1 * | 6/2013 | Hazanchuk et al. | .......... 708/230 |
| 2005/0144210 A1 | 6/2005 | Simkins et al. | |
| 2006/0190516 A1 * | 8/2006 | Simkins et al. | ............... 708/490 |
| 2010/0191786 A1 * | 7/2010 | Simkins et al. | ............... 708/209 |

* cited by examiner

*Primary Examiner* — Chat Do
*Assistant Examiner* — Calvin M Brien
(74) *Attorney, Agent, or Firm* — W. Eric Webostad

(57) ABSTRACT

An apparatus is disclosed. This apparatus includes a digital signal processing ("DSP") block having a preadder-register block coupled to receive first through fourth input operands. A multiplier is coupled to the preadder-register block to receive a multiplicand operand and a multiplier operand. A first register block is coupled to the multiplier to receive sets of partial products from the multiplier. A second register block coupled to receive the third operand input. An arithmetic logic unit ("ALU") block is coupled to the pre-adder-register block, the first register block and the second register block. The ALU block includes four input multiplexers and an ALU, where the ALU is coupled to receive outputs from each of the four input multiplexers.

9 Claims, 10 Drawing Sheets

| INMODE[4] | INMODE[3] | INMODE[2] | INMODE[1] | INMODE[0] | AMULTSEL | Mult. A Port | Mult. B Port |
|---|---|---|---|---|---|---|---|
| 0/1 | 0 | 0 | 0 | 0 | FALSE | A2 | B2/B1 |
| 0/1 | 0 | 0 | 0 | 1 | FALSE | A1 | B2/B1 |
| 0/1 | 0 | 0 | 1 | 0 | FALSE | Zero | B2/B1 |
| 0/1 | 0 | 0 | 1 | 1 | FALSE | Zero | B2/B1 |
| 0/1 | 0 | 1 | 0 | 0 | TRUE | A2 | B2/B1 |
| 0/1 | 0 | 1 | 0 | 1 | TRUE | A1 | B2/B1 |
| 0/1 | 0 | 1 | 1 | 0 | TRUE | Zero | B2/B1 |
| 0/1 | 1 | 1 | 1 | 1 | TRUE | Zero | B2/B1 |
| 0/1 | 1 | 0 | 0 | 0 | TRUE | D+A2 | B2/B1 |
| 0/1 | 1 | 0 | 0 | 1 | TRUE | D+A1 | B2/B1 |
| 0/1 | 1 | 0 | 1 | 0 | TRUE | D1 | B2/B1 |
| 0/1 | 1 | 0 | 1 | 1 | TRUE | D1 | B2/B1 |
| 0/1 | 1 | 1 | 0 | 0 | TRUE | −A2 | B2/B1 |
| 0/1 | 1 | 1 | 0 | 1 | TRUE | −A1 | B2/B1 |
| 0/1 | 1 | 1 | 1 | 0 | TRUE | Zero | B2/B1 |
| 0/1 | 1 | 1 | 1 | 1 | TRUE | Zero | B2/B1 |
| 0/1 | 1 | 0 | 0 | 0 | TRUE | D−A2 | B2/B1 |
| 0/1 | 1 | 0 | 0 | 1 | TRUE | D−A1 | B2/B1 |
| 0/1 | 1 | 0 | 1 | 0 | TRUE | D | B2/B1 |
| 0/1 | 1 | 0 | 1 | 1 | TRUE | D | B2/B1 |

FIG. 5

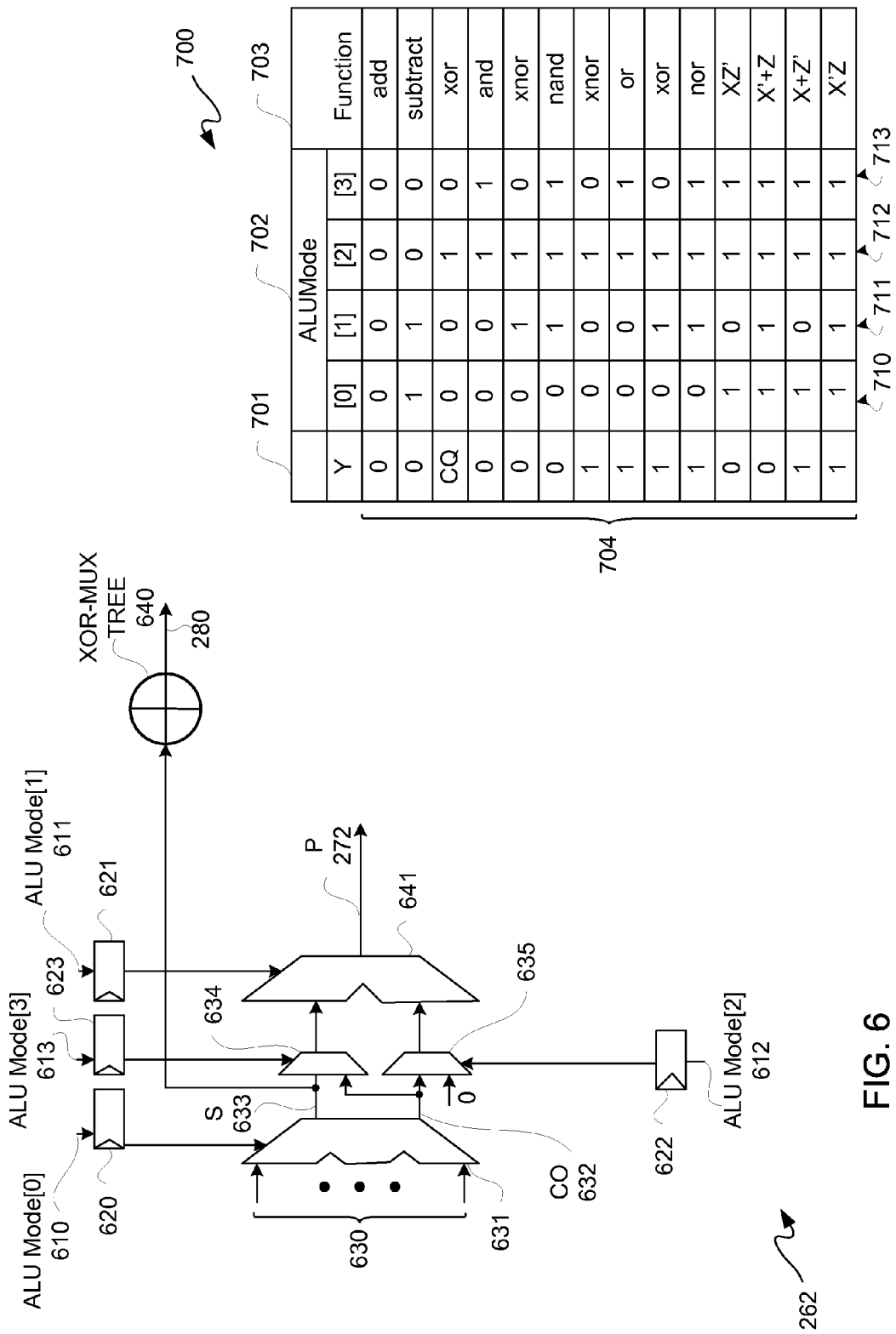

| INMODE[4] | INMODE[3] | INMODE[2] | INMODE[1] | INMODE[0] | PREADDNSEL | BMULTSEL | USE_DPORT (AMULTSEL) | Multiplier A Port | Multiplier B Port | PreAdd/Mult Function |
|---|---|---|---|---|---|---|---|---|---|---|
| 0/1 | 0 | 0 | 0 | 0/1 | 0 | 0 | FALSE | A2A1 | B2B1 | A*B |
| 0/1 | 0 | 0 | 1 | X | 0 | 0 | FALSE | Zero | B2B1 | B*Zero |
| X | 0/1 | 1 | 0 | 0/1 | 0 | 1 | TRUE | D+/-A2A1 | D+/-A2A1 | (D+/-A)**2 |
| X | 0 | 1 | 1 | X | 0 | 1 | TRUE | D | D | D**2 |
| X | 0/1 | 0 | 0 | 0/1 | 0 | 1 | TRUE | +/-A2A1 | +/-A2A1 | A**2 |
| X | 0/1 | 0 | 1 | 0/1 | 0 | 1 | FALSE | A2A1 | +/-A2A1 | +/-(A**2) |
| X | 0/1 | 1 | 1 | 0/1 | 1 | 1 | FALSE | A2A1 | D+/-A2A1 | (D+/-A)*A |
| X | 0 | 1 | 0 | 0/1 | 1 | 1 | FALSE | A2A1 | D+/-B2B1 | (D+/-B)*A |
| X | 0/1 | 0 | 0 | 0/1 | 1 | 1 | FALSE | A2A1 | D | D*A |
| 0/1 | 0/1 | 0 | 0 | 0/1 | 1 | 1 | TRUE | D+/-B2B1 | +/-B2B1 | (+/-B)*A |
| 0/1 | 0/1 | 0 | 0 | 0/1 | 1 | 1 | TRUE | +/-B2B1 | D+/-B2B1 | (D+/-B)**2 |
| 0/1 | 0/1 | 0 | 0 | 0/1 | 1 | 0 | TRUE | +/-B2B1 | +/-B2B1 | B**2 |
| 0/1 | 0 | 0 | 0 | 0/1 | 1 | 0 | TRUE | D+/-B2B1 | B2B1 | +/-(B**2) |
| 0/1 | 1 | 0 | 0 | 0/1 | 1 | 0 | TRUE | D+/-B2B1 | B2B1 | (D+/-B)*B |
| 0/1 | 0 | 0 | 0 | 0/1 | 0 | 0 | TRUE | D+/-A2A1 | B2B1 | (D+/-A)*B |

FIG. 10

DIGITAL SIGNAL PROCESSING BLOCK

TECHNICAL FIELD

An embodiment relates to integrated circuit devices ("ICs"). More particularly, an embodiment relates to a digital signal processing block for an IC.

BACKGROUND

Performance of a design instantiated using programmable resources of a Field Programmable Gate Array ("FPGA fabric") is limited by the speed of the FPGA fabric. However, dedicated or embedded circuit resources ("hard macros"), such as digital signal processing blocks ("DSPs") in an FPGA, are capable of performing operations faster than equivalent circuits implemented in FPGA fabric. Accordingly, it would be desirable and useful to provide means for expanding the usefulness of DSPs.

SUMMARY

One or more apparatuses generally relate to a digital signal processing block.

An apparatus relates generally to an integrated circuit. In this apparatus, a digital signal processing ("DSP") block has an input interface for receiving a first operand input, a second operand input, a third operand input, and a fourth operand input. The DSP block comprises: a preadder-register block coupled to receive the first operand input, the second operand input, and the fourth operand input; a multiplier coupled to the preadder-register block to receive a multiplicand operand and a multiplier operand therefrom; and a first register block coupled to the multiplier to receive a first set of partial products and a second set of partial products from the multiplier. The DSP block further comprises: a second register block coupled to receive the third operand input; and an arithmetic logic unit ("ALU") block coupled to the pre-adder-register block, the first register block and the second register block. The ALU block comprises: a first multiplexer coupled to receive the third operand input from the second register block and a feedback product input from a product output of the ALU block; a second multiplexer coupled to receive the first set of partial products and the product input fed back; a third multiplexer coupled to receive the second set of partial products and the third operand input from the second register block; a fourth multiplexer coupled to receive the product input fed back and the third operand input from the second register block; and an ALU coupled to receive outputs from each of the first multiplexer, the second multiplexer, the third multiplexer, and the fourth multiplexer.

Another apparatus relates generally to another integrated circuit. In this apparatus, a digital signal processing ("DSP") block has an input interface for receiving a first input operand, a second input operand, a third input operand, a first cascade operand, and a second cascade operand. The DSP block comprises: a preadder-register block, a register block coupled to the preadder-register block, and a multiplier coupled to the preadder-register block and the register block to receive a first multiplication operand and a second multiplication operand respectively therefrom. The preadder-register block is coupled to receive the first input operand, the second input operand, and the first cascade operand. The preadder-register block includes an adder/subtractor coupled to provide a result operand as output therefrom. The register block is coupled to receive the third input operand and the second cascade input. The preadder-register block and the register block in combination are configurable to provide the first multiplication operand and the second multiplication operand to the multiplier to obtain partial products for obtaining a square of the result operand.

Yet another apparatus relates generally to yet another integrated circuit. In this apparatus, a plurality of digital signal processing ("DSP") slices are coupled to one another for performing multiplication of a first complex variable and a second complex variable. Each of the DSP slices has an input interface for receiving a first operand input, a second operand input, a third operand input, and a fourth operand input. Each of the DSP slices comprises: a preadder-register block coupled to receive the first operand input, the second operand input, and the fourth operand input; a multiplier coupled to the preadder-register block to receive a multiplicand operand and a multiplier operand therefrom; a first register block coupled to the multiplier to receive a first set of partial products and a second set of partial products from the multiplier; a second register block coupled to receive the third operand input; and an arithmetic logic unit ("ALU") block coupled to the pre-adder-register block, the first register block and the second register block. The ALU block comprises: a first multiplexer coupled to receive the third operand input from the second register block and a feedback product input from a product output of the ALU block; a second multiplexer coupled to receive the first set of partial products and the product input fed back; a third multiplexer coupled to receive the second set of partial products and the third operand input from the second register block; a fourth multiplexer coupled to receive the product input fed back and the third operand input from the second register block; and an ALU coupled to receive outputs from each of the first multiplexer, the second multiplexer, the third multiplexer, and the fourth multiplexer.

BRIEF DESCRIPTION OF THE DRAWINGS

Accompanying drawings show exemplary embodiments. However, the accompanying drawings should not be taken to limit the embodiments shown, but are for explanation and understanding only.

FIG. 5 is a table diagram depicting an exemplary inmode function table.

FIG. 6 is a block/circuit diagram depicting an exemplary arithmetic logic unit ("ALU").

FIG. 7 is a table diagram depicting an exemplary operations table for the ALU of FIG. 6.

FIG. 10 is a table diagram depicting an exemplary arithmetic operations table for the DSP slice of FIG. 2.

DETAILED DESCRIPTION

Figure 1:
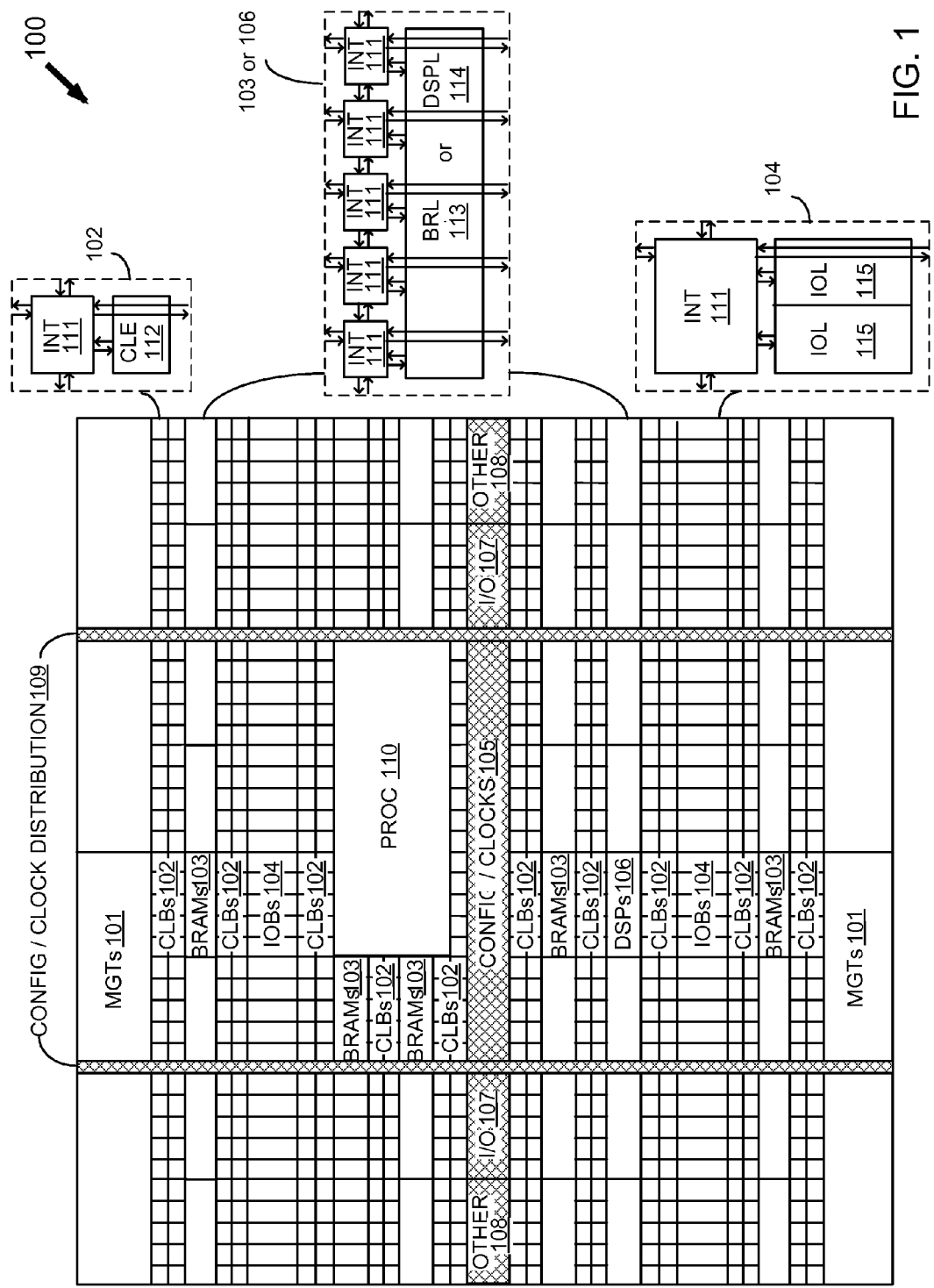
FIG. 1 is a simplified block diagram depicting an exemplary embodiment of a columnar Field Programmable Gate Array ("FPGA") architecture.

In the following description, numerous specific details are set forth to provide a more thorough description of the specific embodiments. It should be apparent, however, to one skilled in the art, that one or more embodiments may be practiced without all the specific details given below. In other instances, well known features have not been described in detail so as not to obscure the one or more embodiments. For ease of illustration, the same number labels are used in different diagrams to refer to the same items; however, in alternative embodiments the items may be different.

Before describing exemplary embodiments illustratively depicted in the several figures, a general introduction is provided to further understanding.

As demands for speed increase, adding functionality in the form of configurable (or programmable) hard macros in SoC, FPGA, or other ICs likewise increases. One area for increased speed of operation is digital signal processing. Described below is a digital signal processing slice that may be replicated for having multiple instances thereof in an IC. Such digital signal processing slices for example may be grouped in a column, where output of one such slice may be input to an adjacent slice. The following slices include: a preadder that, in combination with a multiplier, is configurable to provide a square of an input and that provides additional versatility in sourcing variables, an ALU that includes an XOR-MUX tree which allows for SIMD arithmetic and logic operations, including without limitation SIMD XOR operations, and an ALU block with a fourth input multiplexer to allow for a round constant or a feedback input to provide an accumulator function.

With the above general understanding borne in mind, various embodiments for digital signal processing data path elements or slices are generally described below.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing data path elements or blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
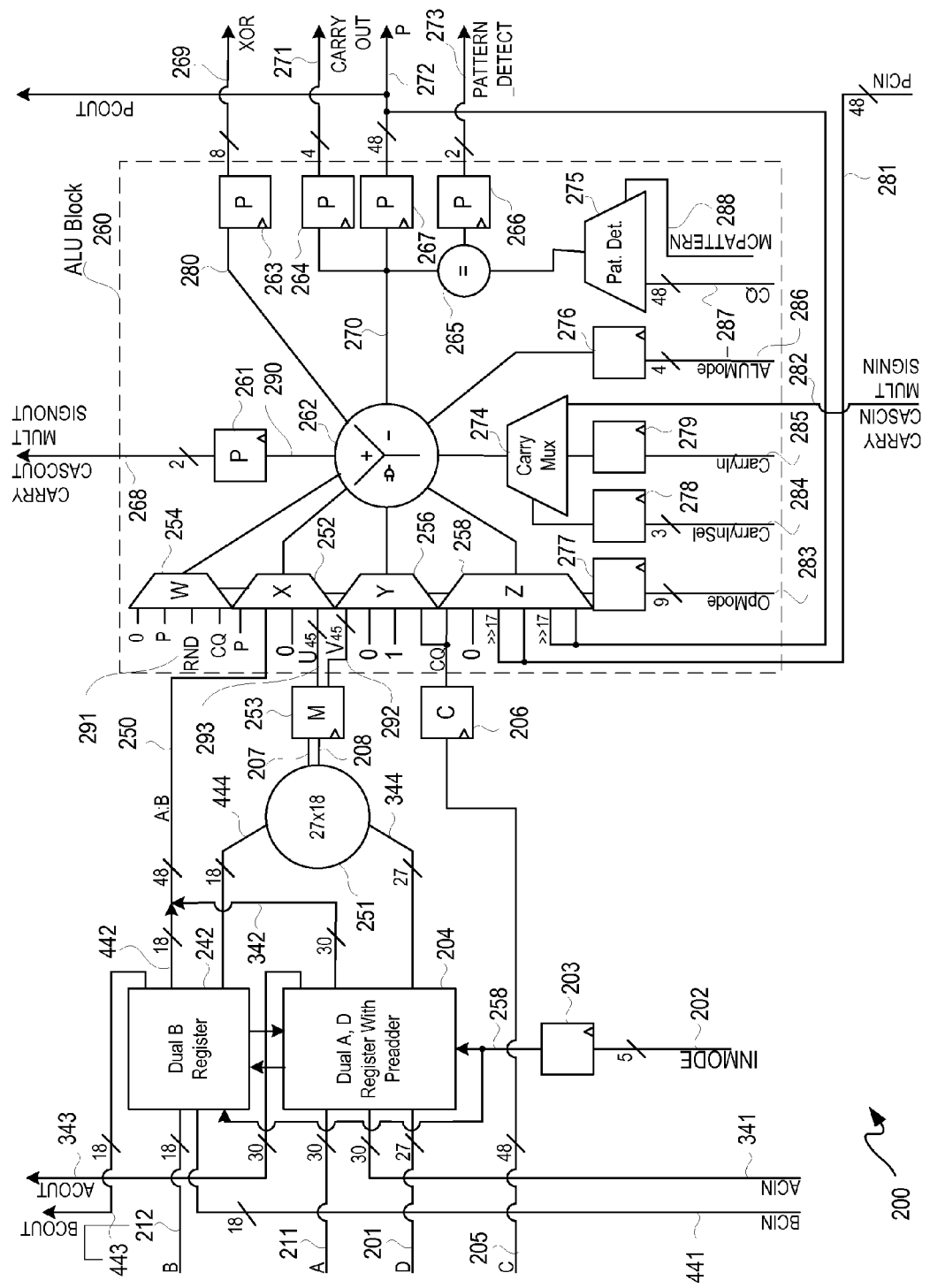
FIG. 2 is a block/circuit diagram depicting an exemplary DSP slice.

FIG. 2 is a block/circuit diagram depicting an exemplary DSP slice 200. DSP slice 200 may, though need not, be an exemplary DSP 106 of FPGA 100 of FIG. 1. Along those lines, DSP slice 200 need not be in an FPGA, but may be used in any of a variety of ICs having configurable hard macro blocks.

With respect to an input interface of DSP slice 200, D input signal ("input") 201, A input 211, A cascade input ("ACIN" or "AC input") 341, and input mode signals ("inmodes", which refers to INMODE in FIG. 2) 202, are provided to a dual A, D register with preadder-register block 204, where inmodes 202 are provided to inmode register 203 for preadder-register block 204, as well as for a dual B register block 242, as described below in additional detail. In this example, there are five inmodes 202; however, in other embodiments fewer or more than five inmodes 202 may be used. B input 212 and B cascade input ("BCIN" or "BC input") 441 are provided to dual B register ("register block") 242. C input 205 is provided to C register 206, and output from C register 206 in this example may be a 48 bit wide output, namely operand "CQ." In this example, A input 211, B input 212, C input 205, and D input 201 respectively are 30, 18, 48, 27 bits wide. BCIN 441 and ACIN 341 in this example respectively are 18 and 30 bits wide. In other embodiments, other bit widths for these signals may be used. Furthermore, the terms "input" and "output" are used interchangeably to indicate either or both of a signal and a port or bus, including without limitation their plural forms.

With respect to a portion of an output interface of DSP slice 200, register block 242 and preadder-register block 204 respectively provide a B cascade output ("BCOUT") 443 and an A cascade output ("ACOUT") 343, which in this example are 18 and 30 bits wide, respectively. However, in other embodiments, other bit widths may be used, as previously indicated herein.

Other outputs of register block 242 and preadder-register block 204 may be combined to provide an [A:B] output 250, which is a parallel bus concatenation of an A/ACIN input operand and a B/BCIN input operand, which in this example is a 30 bit wide bus output 342 from preadder-register block 204 combined with an 18 bit wide bus output 442 from register block 242 to form a 48 bit wide output 250. A multiplication operand may be output from register block 242 for input to a multiplier 251 via an output 444, and another multiplication operand may be output from preadder-register block 204 for input to multiplier 251 via an output 344. In this example, output 444 is 18 bits wide, and output 344 is 27 bits wide. Furthermore, in this example, a multiplication operand provided on output 444 is a multiplier operand, and a multiplication operand provided on output 344 is a multiplicand operand. However, in other embodiments, a multiplier operand and a multiplicand operand may respectively be on output 344 and output 444. Multiplier 251 may have a mode to save power, where input operands are gated off. If a user does not dynamically switch from a logic operations mode to a multiplier mode, power gating off multiplier 251 input operands saves power because multiplier 251 is bypassed when performing logic operation mode functions.

Two separate sets of partial products may be provided from multiplier 251 to M register 253 as a partial product operand "U" on output 207 and a partial product operand "V" on output 208. In this example, partial product operands U and V may each be at most 45 bits wide. Partial product operands U and V, and operand CQ may be provided to an ALU block 260, as described below in additional detail. However, prior to a description of ALU block 260, preadder-register block 204 and register block 242 are described in additional detail.

Figure 3:
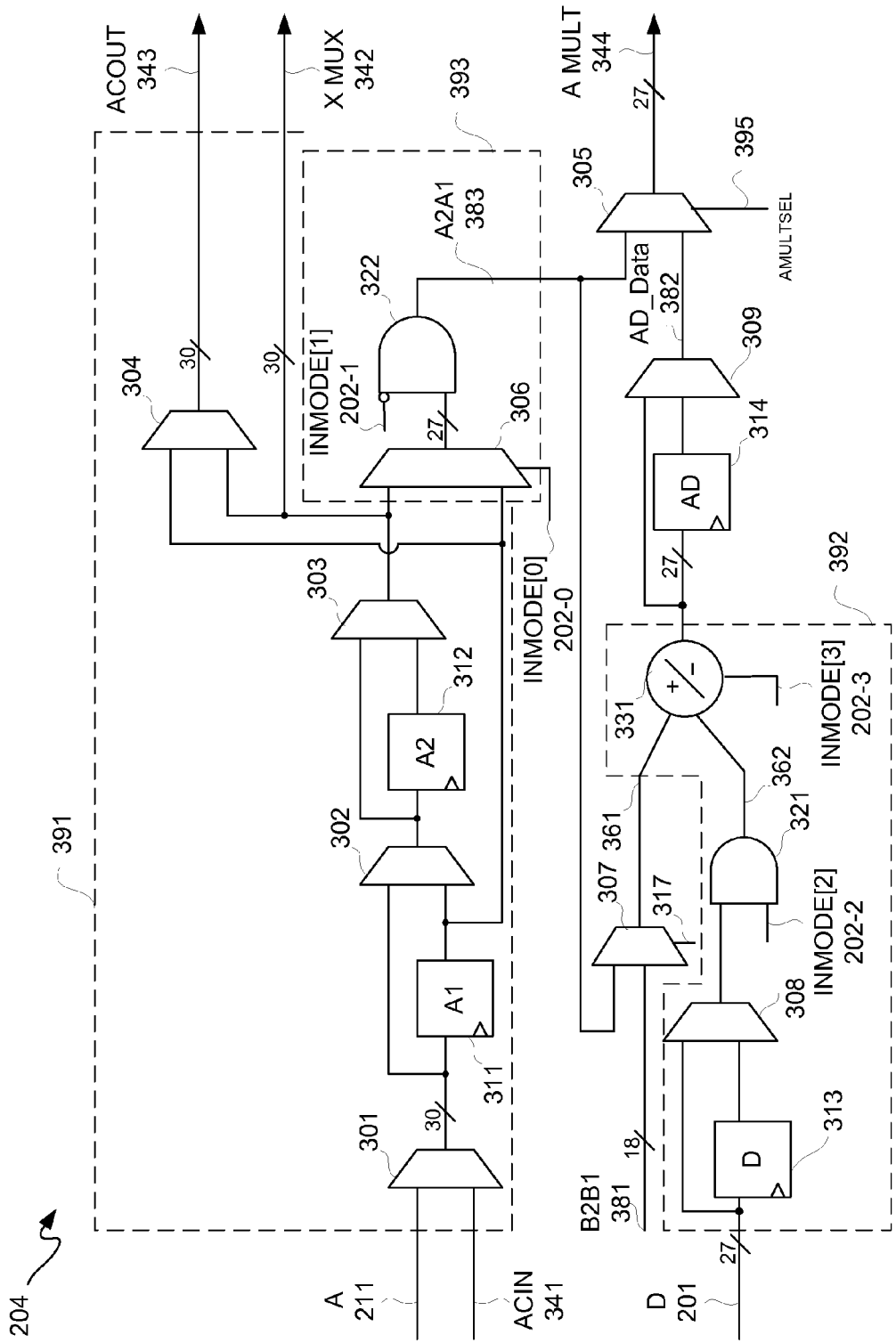
FIG. 3 is a circuit diagram depicting an exemplary preadder of the DSP slice of FIG. 2.

FIG. 3 is a circuit diagram depicting an exemplary embodiment of preadder-register block 204. As described below in additional detail, preadder-register block 204 may be dynamically configured to operate as being 0, 1, 2, or 3 registers deep.

Preadder-register block 204 includes multiplexers 301 through 309, registers 311 through 314, logic gates 321 and 322, and adder/subtractor 331. It should be appreciated that even though bit widths are illustratively shown in FIG. 3, as well as in FIGS. 2 and 4, bit widths other than, or the same as, those illustratively shown herein, or a combination thereof, may be used.

While not shown for purposes of clarity and not limitation, control select inputs to multiplexers 301 through 305, 308, and 309 may be provided from configuration memory cells of FPGA fabric. Such configuration memory cells may be configured from user provided configuration information. Thus, in the context of an FPGA, when such FPGA is obtaining state information as part of a power up cycle, the program states of those memory cells determine selected outputs for multiplexers 301 through 305, 308 and 309, and such memory cells are not capable of having their state changed without resetting the FPGA. In other words, the status of multiplexers 301 through 305, 308, and 309 during operation is static. In contrast to the static status of multiplexers 301 through 305, 308, and 309 during FPGA operation, multiplexer 306 is dynamically operable; in other words, multiplexer 306 may have its control select changed during operation of an FPGA without having to reset such FPGA. Such control select, in this exemplary embodiment, is provided by a portion of inmodes 202, namely inmode 202-0, where the "-0" is used to indicate bit position zero of an inmode bus 258 of FIG. 2.

With respect to multiplexer 307, a preadder input select signal 317 may be used to select output of such multiplexer. In this example, a configuration memory cell (not shown) is used to provide such preadder input select signal 317 to multiplexer 307, and thus is a static signal as previously described. However, in another embodiment, such a preadder input select signal 317 may be provided as a dynamically alterable signal, as multiplexer 307 may be dynamically operable. However, for purposes of clarity and not limitation, it shall be assumed that such a preadder input select signal 317 is provided from a configuration memory cell. Along those lines, even though static configuration memory cell provided control select signals to multiplexers are described herein, in other configurations one or more of such static select signals may be replaced with one or more corresponding dynamic select signals.

Moreover, in addition to dynamic operation of multiplexer 306, logic gates 321 and 322, as well as adder/subtractor 331, may be dynamically operated. Thus, such dynamically operable components may be changed during operation of user design. In this embodiment, inmodes 202-0 through 202-3 of FIG. 3, as well as inmode 202-4 of FIG. 4, may be changed on each cycle of a clock signal. For purposes of clarity by way of example and not limitation, clock signaling such as may be used herein is not shown.

Inmode 202-0 is provided as a dynamic control select signal to multiplexer 306 for gating to provide either A input 211 or AC input 341 as delayed by either of A1 register 311 or A2 register 312, by both A1 register 311 and A2 register 312, or by neither A1 register 311 nor A2 register 312. Again, once selected by memory cell state, a selected output from multiplexers 301 through 305 is static during operation without resetting an FPGA.

Either A input 211 or AC input 341 may be output from multiplexer 301. Output from multiplexer 301 is provided as data input to A1 register 311 and as data input to multiplexer 302. Output of A1 register 311 is provided as data input to multiplexers 302, 304, and 306. Output of multiplexer 302 is provided as data input to A2 register 312 and as data input to multiplexer 303. Output of multiplexer 303 is provided as data input to multiplexers 304 and 306, as well as being provided as an X MUX output 342. Referring to FIG. 2, X MUX output 342 of preadder-register block 204 may be combined with output 442 of dual B register block 242 of FIG. 2 for an AB concatenated output 250.

For purposes of clarity by way of example and not limitation, assuming a user has set multiplexers 302 and 303 to select their bottom inputs as outputs, and assuming that a user has selected AC input 341, namely A cascaded input from another DSP slice, as an output of multiplexer 301, then AC input 341 provided as data input to multiplexer 301 is registered by both A1 register 311 and A2 register 312 on an upper data input of multiplexer 306, and on a lower input of multiplexer 306, AC input 341 is registered by just A1 register 311. Accordingly, it should be appreciated that a user may select the register depth to an upper port of multiplexer 306, while the register depth of input to a lower port of multiplexer 306 is always just A1 deep. Multiplexers 301 through 304 and registers 311 and 312 may be thought of as a register stage 391.

As previously mentioned, preadder-register block 204 includes a dual A register and a dual D register. By this it is meant that A1 register 311 and A2 register 312 are dual-register configurable, even though both A1 and A2 registers, only one of A1 and A2 registers, or neither of A1 and A2 registers may be used in providing input to logic gate 322 via output of multiplexer 306. Furthermore, the dual D register is in reference to D register 313 and AD register 314.

Again, it should be appreciated that the upper input to multiplexer 306, as well as the lower input to multiplexer 304, sourced from the output of multiplexer 301 may be no registers deep, either A1 or A2 deep, or A1 and A2 deep. Furthermore, again, the lower input of multiplexer 306, as well as the upper input of multiplexer 304, is always A1 deep. Output of multiplexer 304 is AC output ("ACOUT") signal ("AC output") 343 of FIG. 2, which may be provided to another DSP slice, similarly to AC input 341 being provided to DSP slice 200 of FIG. 2.

Whether an upper input or a lower input of multiplexer 306 is selected for output is controlled by the state of inmode 202-0, and output from multiplexer 306 is provided as data input to logic gate 322. Even though AND gates are illustratively depicted for logic gates 321 and 322, it should be appreciated that other logic gates may be used in accordance with the description herein. The other input of AND gate 322, which is an inverted input, is coupled to receive inmode 202-1. For this embodiment, inmode 202-1 represents bit position one of a bus of inmodes 202. Output of AND gate 322 is provided as an input to multiplexer 307 and to an upper input of multiplexer 305. Output of AND gate 322 may be thought of as an A2 or A1 ("A2A1") signal or data operand 383. Multiplexer 306 and AND gate 322 may be thought of as being of a multiplexer-logic stage 393.

Another input to multiplexer 307 is a B2 or B1 ("B2B1") signal 381, which is obtained from register block 242. Along those lines, multiplexer 307 may be thought of as a bridge multiplexer bridging preadder-register block 204 and register block 242. Output of multiplexer 307 is selected as between data operands input thereto to select a preadder operand input to adder/subtractor 331. Output of multiplexer 307 to adder/subtractor 331 is generally referred to A path input 361.

D input 201 may be provided as data input operand to D register 313 and to an upper input of input multiplexer 308. Data output of D register 313 may be provided to a lower input of input multiplexer 308. Output of input multiplexer 308 may be provided as a registered or unregistered version of an input operand to an upper input of AND gate 321. A lower input of AND gate 321 may be coupled to receive inmode 202-2, which for this embodiment is bit position two of a bus of inmodes 202. Output of AND gate 321 may be provided as another input to adder/subtractor 331, namely D path input 362, such as to provide another preadder operand to adder/subtractor 331.

Whether adder/subtractor 331 is configured for adding or subtracting is controlled by inmode 202-3, which for this embodiment is bit position three of a bus of inmodes 202. Generally, D register 313, input multiplexer 308, AND gate 321 and adder/subtractor 331 may be thought of as an input block or sub-block 392 of preadder-register block 204.

Output of adder/subtractor 331 may be provided as an AD data operand or a result operand to a data input port of an interim register, namely AD register 314, and to an input port of an interim multiplexer, namely multiplexer 309. Output of AD register 314 may be provided as another input to multiplexer 309. Output of multiplexer 309, namely a registered or unregistered version of AD data, may be provided to another input of multiplexer 305. Output of multiplexer 309 may be referred to as AD data 382, referring back to A path 361 and D path 362. Output of multiplexer 305 may be a multiplication operand signal, namely A multiplier ("A MULT") signal 344. In this example, A multiplier signal 344 is provided to a multiplier 251 of FIG. 2 as a multiplicand operand, though in other configurations A multiplier signal 344 may be provided as a multiplier operand.

Again, it should be appreciated that multiplexer 306, AND gate 322, AND gate 321, adder/subtractor 331 are respectively controlled for purposes of dynamic operation by inmodes 202-0 through 202-3, respectively representing bit positions zero through three of a bus of inmodes 202. While inmodes 202-0 and 202-3 are used as control select signals for either selecting an output or a function, inmodes 202-1 and 202-2 are operative, by their state, for affecting or not affecting outputs of AND gates 322 and 321, respectively.

In addition to being able to dynamically control AND gates 321 and 322, output of either of AND gates 321 and 322 may be used to source a zero input to adder/subtractor 331. Accordingly, it should be appreciated that if AND gate 322 provides a zero operand input to adder/subtractor 331, then the input of D input 201 which may be provided as an output of output multiplexer 305, may pass through registers 313 and 314, namely a two deep register path. Alternatively, if a zero is sourced from the output of AND gate 321, and adder/subtractor 331 is used, then it is possible to have a three deep register path for either of A input 211 or AC input 341, namely through A1 register 311, A2 register 312, and AD register 314.

Figure 4:
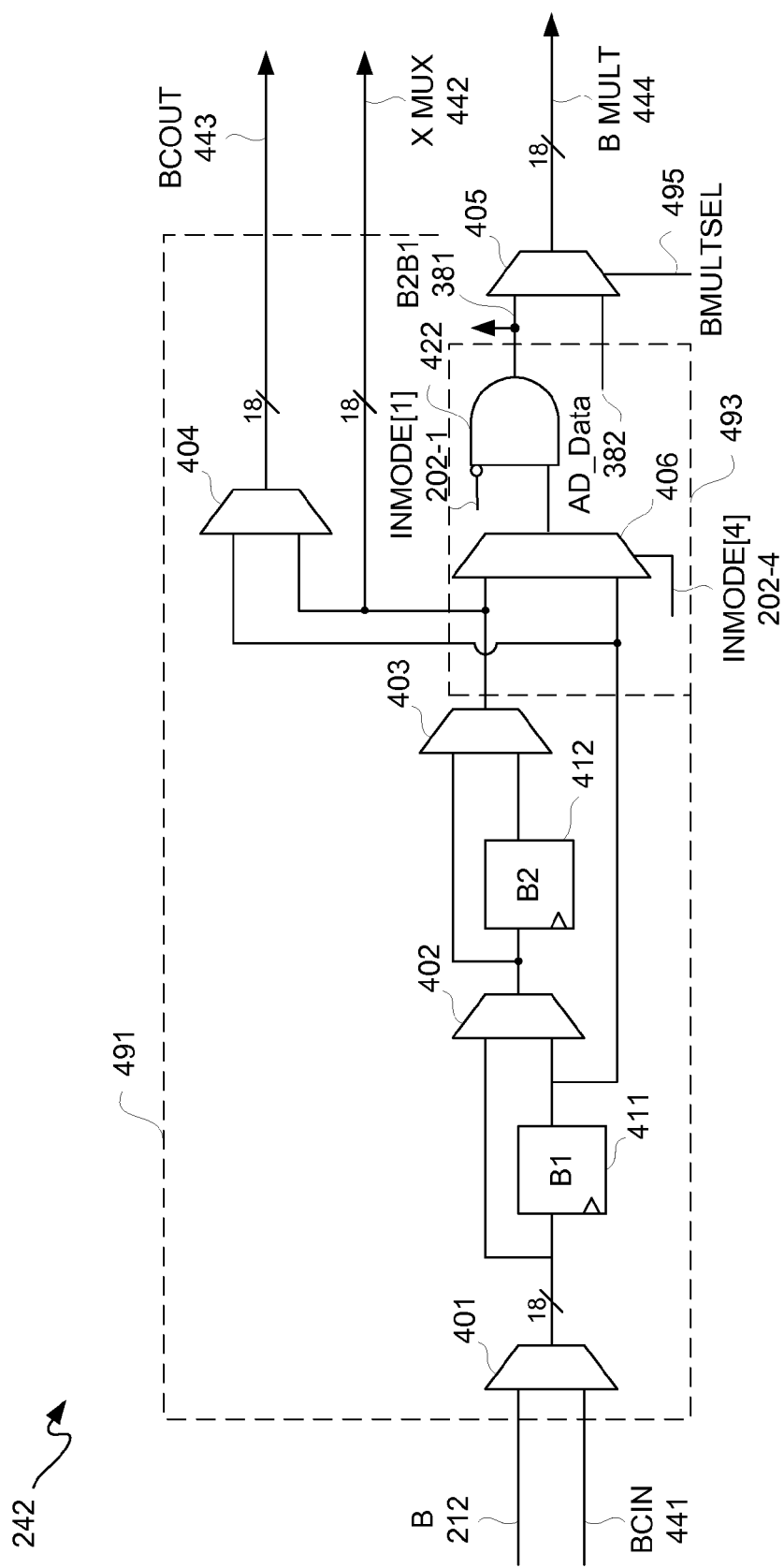
FIG. 4 is a circuit diagram depicting an exemplary dual B register of the DSP slice of FIG. 2.

FIG. 4 is a circuit diagram depicting an exemplary embodiment of dual B register block 242 of DSP slice 200 of FIG. 2. B input signal ("B input") 212 and BC or B cascade input ("BCIN") signal ("BC input") 441 are provided as operand inputs to multiplexer 401. Multiplexers 401 through 405 of dual B register block 242, like multiplexers 301 through 305, are static during operation, namely their outputs are established during configuration of an FPGA and are not dynamically reconfigurable during operation. Multiplexer 406, like multiplexer 306, is dynamically operable responsive to inmode 202-4, which for this embodiment represents bit position four of a bus of inmode 202.

B1 register 411 and B2 register 412 correspond to A1 register 311 and A2 register 312. Likewise, multiplexers 401 through 405 respectively correspond to multiplexers 301 through 305. Furthermore, multiplexer 406 corresponds to multiplexer 306. BC or B cascade output ("BCOUT") signal ("BC output") 443 from multiplexer 404 corresponds to AC output 343, though for this example with a smaller bit width.

Likewise, X multiplexer ("X MUX") signal 442 corresponds to X multiplexer signal 342, though again with a smaller bit width for this example. It should be appreciated that X multiplexer signals 342 and 442 may be AB concatenated as generally indicated as AB output 250 of FIG. 2 for input to an X multiplexer 252.

Multiplexers 401 through 404 and registers 411 and 412 may generally be considered as being parts of a register stage 491. Multiplexer 406 and AND gate 422 may generally be thought of as being parts of a multiplexer-logic stage 493.

Multiplexer 405, like multiplexers 304, 305, and 404 may generally be thought of as an output multiplexer. Because register stage 491 of dual B register block 242 is the same or similar to a dual A register stage 391 of preadder-register block 204, repeated description is avoided for purposes of clarity. Likewise, because multiplexer-logic stage 493 is the same or similar to multiplexer-logic stage 393 of preadder-register block 204, repeated description is avoided for purposes of clarity, except that a data operand output from AND gate 422 is B2B1 signal 381.

Inputs to output multiplexer 405 are AD data or result operand signal 382 and B2B1 data operand signal 381. Output of multiplexer 405, which may be selected responsive to a static B multiplexer select signal 495, is another multiplication operand signal, namely B multiplier ("B MULT") signal 444, which corresponds to A multiplier signal 344. B multiplier signal 444 and A multiplier signal 344 for this embodiment have different bit widths; however, both outputs may be provided as input operands to a multiplier 251 of FIG. 2. In this example, B multiplier signal 444 provides a multiplier operand to multiplier 251; however, in other embodiments B multiplier signal 444 may be a multiplicand operand provided to a multiplier.

With simultaneous reference to FIGS. 2 through 4, DSP slice 200 is further described. Inmodes 202 busing may be considered a dynamic control bus. In addition to inmodes 202, there may be a clock signal, a clock enable signal, a set signal, or a reset signal, among other register control signals. These signals are not shown as going into registers for purposes of clarity and not limitation. For example, independent/separate clock enable signals to registers may be used to allow a 2-deep A:B for selectively writing to either A1 or A2 or both A1 and A2 based on configuration memory cell settings and source of the input data. The same may be said for B1 and B2.

AB concatenated output 250 does not have M register 253 in its path. Thus, a multiply operation between A and B has three pipeline register stages, and an add operation, such as an addition of AB concatenated ("A:B") and C has two register stages. However, by the use of A2 register 312 and B2 register 412, registers A2 312 and B2 412 may be used to provide a register pipeline stage which would otherwise be associated with M register 253. In other words, the number of pipeline stages for inputs to X multiplexer 252 may be configured to be the same within DSP slice 200, which can be used to avoid register misses, namely "bubbles." Accordingly, by setting an operational mode, as described below in additional detail, an A:B+C operation for example and an A*B+C operation for example may both be performed in three clock cycles, e.g., A1 register 311 to A2 register 312 to a P register 271 of FIG. 2 for an A:B+C operation, and A1 register 311 to M register 253 to a P register 271 of FIG. 2 for A of an A*B+C operation (e.g., likewise B1 register 411 to M register 253 to a P register 271 of FIG. 2). A C register of FIG. 2 has one less register than A and B in both of the above examples, but such difference is predictable for all operational modes and thus may be accounted for in FPGA fabric to add in another register stage for C. It should be understood that this allows for dynamically alternating between multiply and add operation on alternate clock cycles without a bubble.

A1 register 311, and A2 register 312, as well as B1 register 411 and B2 register 412, may be used to provide a register file function. Because of the dynamic control bus function of inmodes 202, such register file may operate as a random access register file. Alternatively, A1 register 311, and A2 register 312, as well as B1 register 411 and B2 register 412, may be configured to provide shift register logic ("SRL"). Thus dual functionality of both a random access register file and an SRL is provided within DSP slice 200 using dynamic control via an inmodes bus 202. Thus, by bus, it should generally be understood to mean either a group of signals or a group of signal traces, or both.

Other functionality includes having preadder-register block 204 used as a two-to-one multiplexer, namely by having adder/subtractor 331 select between inputs thereto for output to AD register 314 by having one of the operands be zero. In other words, one of outputs of AND gates 322 and 321 may be forced to zero respectively, responsive to inmodes 202-1 and 202-2. Additionally, if output of the A input path is a negative, then a zero may be sourced from the operand input along the D path to adder/subtractor 331 such that adder/subtractor 331 may be used to produce an absolute value of an A or AC operand provided to adder/subtractor 331.

Thus, to recapitulate, inmode 202-0 is used as a none/A1/A2 select signal. Inmode 202-1 may be used to zero output along an A register path, namely registers A1 and A2 ("A registers"). In other words, the ability to zero output facilitates multiplexing between A registers and a D register without using resets and without destroying register contents. When inmode 202-1 is equal to a logic 1, A path input 361 to adder/subtractor 331 is forced to zero, and thus D path input 362 to preadder 331 may be effectively selected for output. Additionally, when inmode 202-1 is equal to logic 1, A path input 361 to multiplexer 305 may be used to force A multiplier signal 344 to zero. However, in order to force A multiplier signal 344 to zero, the D port setting, namely the configuration memory cell setting for providing a control select signal 395 to multiplexer 305 is set for disabling the D port, namely "if use_D port=false."

Inmode 202-2 may be used to zero output of D register 313 along the lines previously described with respect to inmode 202-1 and output of an A register selected path. Thus, D path input 362 to adder/subtractor 331 would be a logic 0, which may be used for facilitating multiplexing between A path input 361 and D path input 362. Furthermore, inmode 202-1 and inmode 202-2 may be used for dynamic power gating for power conservation. If inmode 202-1 is at a logic 1 state, the A path input 361 to adder/subtractor 331 is forced to 0, and if inmode 202-2 is at a logic 0 state, the D path input 362 to adder/subtractor 331 is forced to 0. If both inputs to adder/subtractor 331 are logic 0, operation of adder/subtractor 331 consumes less power as there is no transistor switching within adder/subtractor 331 under such condition. Thus, by "dynamic power gating," it is meant that both inputs to adder/subtractor 331 may be set to logic zero when adder/subtractor 331 functionality is not selected. By having fixed logic values provided as operand inputs to adder/subtractor 331, adder/subtractor 331 does not switch, and this may be used for dynamic conservation of power. In other words, because inmodes may be dynamically set for dynamically fixing operand inputs to adder/subtractor 331, adder/subtractor functionality may be dynamically selected or deselected, and with respect to the later, dynamic power conservation may be implemented.

Inmode 202-3 may be used to have the A operand of A input path 361 either added to or subtracted from the D operand of D input path 362 by adder/subtractor 331. Again, dynamic inversion of an A operand on A input path 361 may be used as an absolute value function. In other words, a register value held in A1 or A2 for example may be dynamically inverted by having the D operand input path 362 forced to zero as previously described. Inmode 202-4 may be used as a B1/B2 register select signal in the same way that inmode 202-0 may be used as an A1/A2 register select signal.

Furthermore, it should be appreciated that complex multiplication operations may be performed, such as (A+ai)*(B+bi)=(AB−ab)+(Ab+aB)i. A and a may be separate operands respectively input to A2 register 312 and A1 register 311 by using separate clock enable signals provided to those registers, and selectively outputting one of such two operands from multiplexer 306 responsive to inmode 202-0. Likewise, B and b may be separate operands respectively input to B2 register 412 and B1 register 411 by using separate clock enable signals provided to those registers, and selectively outputting one of such two operands from multiplexer 405 responsive to inmode 202-4. Operands A, B, a, and b may be stored locally in BRAM. Because of operand reuse, BRAM may be accessed in bursts of every other two clock cycles by DSP slice 200, and may be read once for the example complex multiplication operation, as A1, A2, B1 and B2 registers may be used to locally store the real and imaginary parts of such operands. Even though the example of a complex multiplication was used, it should be understood that the same may be said for performing a sequential multiplication, such as (A:a)*(B:b) for example. For purposes of clarity by way of example and not limitation, suppose 42 bits*34 bits is for (A:a)*(B:b), then the result may be obtained by A*B+sh17 (A*0b+B*00000000a+sh17(0b*00000000a), where "sh17" indicates a 17 bit shift.

FIG. 5 is a table diagram depicting an exemplary embodiment of an inmode function table 500. The first five columns of table 500 respectively show possible logic states of inmode bits four through zero respectively corresponding to inmodes 202-4 through 202-0. Inmode 202-4 is a B2/B1 register select signal, and thus if a logic 0 is the state of inmode 202-4, contents of register B2 may be provided as multiplier B port 444 input, and if inmode 202-4 is a logic state 1, multiplier B port 444 input is the contents of B1 register 411. Accordingly, logic 0 and 1 of the first column of table 500 respectively correspond to B2 and B1 of the last column of table 500.

The sixth column of table 500 indicates programming state of a memory cell used to provide control select control of multiplexer 305 of FIG. 3, which is generally indicated as A multiplier select signal ("AMULTSEL") 395 provided to output multiplexer 305. For this example, it is assumed that a B multiplier select signal ("BMULTSEL") 495 is set to logic 0. Thus, A multiplier select signal 395 indicates whether the D port, namely D input 201, is in use. As indicated in the first four rows of table 500, a false value indicates that the D port of preadder-register block 204 is not in use. The remaining rows in column 395, which indicate a true value for A multiplier select signal 395, means that the D port of preadder-register block 204 is in use.

The seventh column of table 500 indicates the operand input on multiplier A port 344. The possible operand inputs illustratively shown are the values held in A1 or A2 for D registers. Additionally, as previously described, a logic 0 may be provided as A multiplier output 344. Furthermore, the value obtained by adding the operand values of D+A2, D+A1, D−A2, or D−A1, as stored in AD register 314 may be provided as A multiplier output 344. The notation A1/A2 and B1/B2 is used to describe one- and two-deep registers, respectively. If A input operands to adder/subtractor 331 are gated off, then D register 313 and AD register 314 in combination appear like a two-deep registers for D port 201. Thus, the notation D1/D2 respectively refers to D/AD registers for one- and two-deep registers, respectively.

Multiplier 251 may be coupled to obtain multiplication operands via A multiplier signal 344 and B multiplier 444 respectively from preadder-register blocks 204 and 242. However, these multiplication operands may both be AD data signal 382, namely the same operand. In other words, preadder-register block 204 and register block 242 may be configured such that the bridged combination provides a same first multiplication operand and second multiplication operand to multiplier 251 to obtain partial products 207 and 208 for obtaining a square of an adder/subtractor 331 result operand, namely a square of AD data 382.

Returning to FIG. 2, ALU block 260 may include: input W multiplexer 254, input X multiplexer 252, input Y multiplexer 256, input Z multiplexer 258, carry multiplexer 274, pattern detect multiplexer 275, input register 277, input register 278, input register 279, input register 276, output register 261, output register 263, output register 264, output register 267, output register 266, comparator 265, and ALU 262. Input register 277 may be coupled to receive operation modes ("opmodes") 283. Opmodes 283 may be used to provide control select signals to W, X, Y, and Z multiplexers. Input register 278 may be coupled to receive carry in select signals 284 to provide select signals to carry multiplexer 274. Output of carry multiplexer 274 may be provided as an input to ALU 262. A carry in signal 285 may be provided to input register 279 for providing an input to carry multiplexer 274, and a carry cascade C operand input/multiplier sign input signal 282 may be provided as another input to carry multiplexer 274. ALU mode signals 286 may be provided to input register 276 for providing as an input to ALU 262.

A C operand output ("CQ") 287 from C register 206 may be provided as an input to pattern detect multiplexer 275, and a configuration memory cell-based pattern select signal 288 may be provided as a control select to pattern detect multiplexer 275. Output of pattern detect multiplexer 275 may be provided to comparator 265. Another input to comparator 265 may be one or more bits of an output bus 270 of ALU 262. Output of comparator 265 may be provided to output register 266 to provide a pattern detect signal 273. A grouping of 48 bits of an output bus 270 of ALU 262 may be provided to output register 267 to provide product ("P") signal 272, and another grouping of four bits of an output bus 270 of ALU 262 may be provided to output register 264 to provide carryout signal 271. P signal 272 may further be provided as a P cascade output signal to another DSP slice 200 as P cascade input signal 281 of such other DSP slice 200. Another output bus 280 of ALU 262 may be provided to output register 263 to provide XOR output 269. Yet another output bus 290 of ALU 262 may be provided to output register 261 to provide carry cascade C/multiplier sign output signal 268.

Input Z multiplexer 258 may be coupled to receive CQ signal 287, a logic 0 input, and P signals 281 and 272. Bus widths for all inputs to W, X, Y, and Z multiplexers are not illustratively depicted, and thus in some instances even though a single line is illustratively indicated, such single line may actually be multiple lines to form a parallel bus input, as should be understood from the description herein. Input Y multiplexer 256 is coupled to receive CQ signal 287, a logic 1 which is effectively a −1 (i.e. as all input bits are logic 1s for a 2s complement notation) input, a logic 0 input, and a partial product V input 292. Such a logic one input to input Y multiplexer 256 may be used as a sign bit. Input X multiplexer 252 is coupled to receive a partial product U input 293, a logic 0 input, AB concatenated signal 250, and P signal 272. Input W multiplexer 254 is coupled to receive CQ signal 287, P signal 272, a logic 0 input, and a round constant ("RND") signal 291.

An output of each of W, X, Y, and Z multiplexers is provided as an input to ALU 262. Again, opmodes signals 283 registered in input register 277 are provided as control select inputs to W, X, Y, and Z multiplexers. Other than separate partial products U 293 and V 292, an additional W input multiplexer 254, round constant signal 291, a modified ALU 262, an output bus 280, output registers 263, an output XOR signal 269, and additional opmodes signals 283 for input register 277 to provide as control select signals to W multiplexer 254, remaining components of ALU block 260 are known, and thus not described in unnecessary detail herein for purposes of clarity. Thus, for purposes of clarity, generally only separate partial products U 293 and V 292, W input multiplexer 254, round constant signal 291, modified ALU 262, output bus 280, output registers 263, output XOR signal 269, and additional opmodes signals 283 for input register 277 to provide as control select signals to W multiplexer 254 are described in further detail below for purposes of clarity and not limitation.

Partial product input U 293 and partial product input V 292 are respectively sourced from M register block 253 as output as separate sets of partial products 207 and 208 from multiplier 251. ALU block 260 is coupled to preadder-register block 204, register block 242, as well as M register block 253 and C register block 206. From the above description, it should be appreciated that a product P output signal 272 of ALU block 260 may be fed back to input W, X, and Z multiplexers.

To recapitulate, a DSP slice 200 has been described, which may be cascaded with one or more other DSP slices 200 to support larger fused data paths, such as for high-performance computing ("HPC") for example. Various sized phase factors may be used, such as for Fast Fourier Transforms ("FFTs").

Furthermore, with the addition of W multiplexer 254, a 4:2 compression ratio may be provided. Round constant 291 may be configuration memory cell-based, for arithmetic operations such as A×B+C+RND for example, among many other types of arithmetic operations some of which are listed herein. Additionally, inclusion of W multiplexer 254 allows for a complex multiply or complex multiply accumulate ("CMACC") with as few as three DSP slices 200. Along those lines, a multiply accumulate function may be provided with a single DSP slice 200. A product P cascade accumulate may also be provided with a single DSP slice 200, such as for a polyphase decimator as in finite impulse response ("FIR") filters.

Providing a 27-bit coefficient input capability along with an 18-bit pre-addition capability allows for instrumentation precision. With a preadder-register block 204 having a 27-bit input capability, a user may have 18-bit preadder input numbers with a 19-bit result. B port operands may be signed-extended to 27-bits for preadder input. Depending on configuration memory cell programming, (D+/−A)2 or (D+/−B)2, where "2" means raised to the power of two or squared, mathematical operations may be performed, such as for use in video DSP applications. Inmode control signals 202 allow dynamic switching from (D+/−A)2 to A square or D squared, or from (D+/−B)2 to B squared or D squared. By providing A squared or B squared in a DSP slice 200, performing such operations in programmable fabric resources may be avoided. DSP slice 200** may be used for (D+/A)*A or (D+/−B)*B arithmetic operations, which supports X2+ X+C operations if D=1 by using a C port input for a constant. By having a 27-bit preadder, a 26-bit D value may be added with a 26-bit A value and not have output of preadder-register block 204** wrap, namely a 27-bit output supports bit growth of 26-bit input operands. For example, for a 27-bit coefficient, an A port may get a 27-bit coefficient input, while a B port may get a preadder output limited to 18-bits, only 17-bit signed, so no wrapping occurs even though a preadder input is 27-bits.

FIG. 6 is a block/circuit diagram depicting an exemplary ALU 262. ALU 262 includes bitwise adder 631, multiplexers 634 and 635, adder 641, XOR-MUX tree 640, and ALU mode registers 620 through 623. FIG. 7 is a table diagram depicting an exemplary operations table 700 for ALU 262 of FIG. 6. With simultaneous reference to FIGS. 1 through 7, ALU 262 is further described. In operations table 700, for example, logic 1s in Y multiplexer output column 701 may represent a bus of logic 1s, namely all logic 1s, or a −1 in a 2's compliment notation.

ALU mode registers 620 through 623 respectively receive ALU mode signals 610 through 613. Columns 710 through 713 of ALU mode columns 702 indicate combinations of bit values for ALU mode signals 610 through 613 in associated rows 704. In table 700, column 701 indicates bit values in associated rows 704 output from Y multiplexer 256 for such ALU modes 702. Column 703 indicates functions performed by ALU 262 for ALU modes 702 and Y multiplexer output 701 input settings. Along those lines, ALU 262 is configurable to provide a plurality of functions including without limitation addition, subtraction, XOR, AND, XNOR, NAND, OR, NOR, X'+Z, X+Z', X'Z, and XZ', where, for example, X'Z is a logic inversion of an output of X multiplexer 252 logically ANDed with an output of Z multiplexer 258. When a logic operations mode is used for ALU 262, multiplier 251 may be bypassed. Thus, X multiplexer 252 output may be used to provide A:B or P; Y multiplexer 256 may be used to provide a logic 0 output for third line input to 3-input XORs of bitwise adder 631 to effectively provide for example 48

2-input XOR functions; or Y multiplexer 256 may output CQ to provide 48 3-input XOR functions. Thus, for example, row nine of table 700 has a Y multiplexer 256 output as a logic 1 to provide 48 2-input XOR functions, where effectively Y multiplexer 256 all logic 1s input cancels an ALUMODE[1] =1 inversion. However, for example, row three of table 700 has Y multiplexer 256 output as CQ to provide either 48 2-input XOR functions or 48 3-input XOR functions. Z multiplexer 258 may be used to select either CQ, P, PCIN as an operand input.

Outputs 630 from one or more of W multiplexer 254, X multiplexer 252, Y multiplexer 256, and Z multiplexer 258 are provided as input to bitwise adder 631. Output of W multiplexer 254 may be set at logic 0 for a wide XOR application, as described below in additional detail. A 4:2 compression is provided with a first and second 3:2 compressors in bitwise adder 631. Bitwise adder 631 has a first 3:2 compressor using three-input XORs at a first level of XOR operations and having an S bus output 633 and carry out bus output 632, as described below in additional detail. A second 3:2 compressor of bitwise adder 631 includes output from W multiplexer 254. The second 3:2 compressor likewise uses a first level of three input XOR gates, though with input from W multiplexer 254, of bitwise adder 631, as well as buses 633 and 632. If logic operations of ALU 262 are being used, there is bypass logic so that bitwise adder 631 appears not to have a second 3:2 compressor. In this configuration for example, a wide XOR tree may be used. However, when arithmetic operations are being performed by ALU 262, such second 3:2 compressor function may be used to provide 4:2 compression in accordance with the description herein. ALU mode signal 610 may be provided to ALU mode register 620, and output of ALU mode register 620 may be provided as control signaling to bitwise adder 631. A sum S output 633 and a carry output ("CO") 632 may be output from bitwise adder 631. Along those lines, bitwise adder 631 effectively may provide an initial row of an XOR tree, and thus a sum S output 633 may be used to feed subsequent XOR gates of XOR-MUX tree 640. In other words, a first or initial level of XOR gates of an XOR-MUX tree 640 may be provided by logic operation circuitry of ALU 262. A second or next higher level of XOR gates of XOR-MUX tree 640 may be coupled to receive sum S output 633. Though XOR gates of bitwise adder 631 are not illustratively depicted for clarity, it should be appreciated that bitwise adder 631 includes such XOR gates such as for addition of partial products. Likewise, even though single signal lines are illustratively depicted for purposes of clarity and not limitation, such signal lines in some instances may be multiple parallel lines.

Sum S output 633 and carry output 632 may be provided as respective inputs to multiplexer 634, and S output 633 may be provided as input to XOR-MUX tree 640. Carry output 632 may further be provided as input to multiplexer 635, and another input to multiplexer 635 is a logic 0 input. ALU mode signal 613 may be provided to multiplexer 634 via ALU mode register 623 as a control select input thereto. Likewise, ALU mode signal 612 may be provided to multiplexer 635 via ALU mode register 622 as a control select input thereto. Outputs from multiplexers 634 and 635 may be provided as inputs to adder 641. ALU mode signal 611 may be provided to adder 641 as control signaling via ALU mode register 621. Output of adder 641 may be product P signal 272. Output of XOR-MUX tree 640 may be output bus 280.

ALU block 260, including without limitation ALU 262, may be configured to dynamically provide either a product output P 272 or an XOR output 280 at a time. In other words, ALU mode signals 610 through 613 may be dynamically changed to alter an active output of ALU 262.

Figure 8:
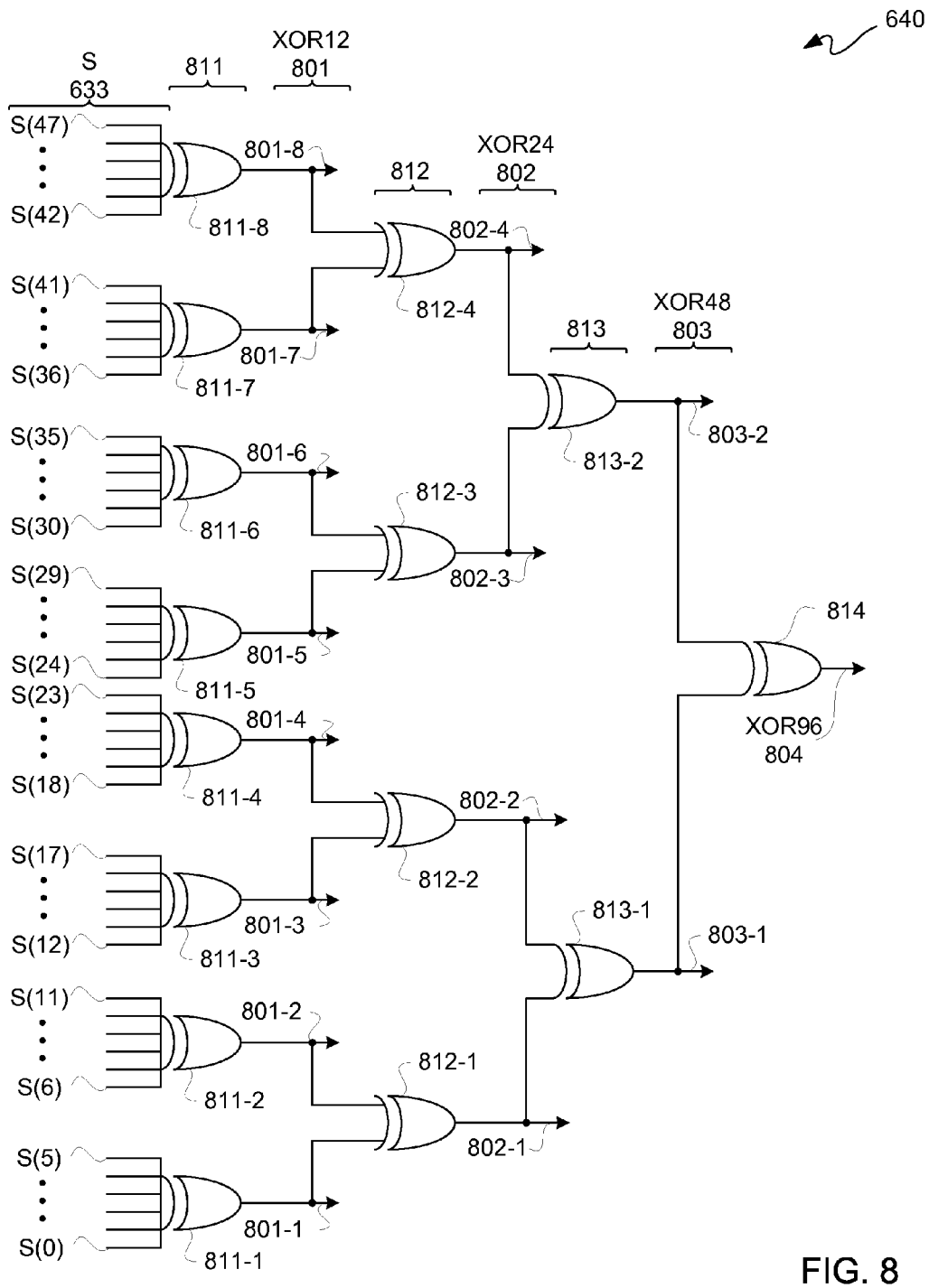
FIG. 8 is a circuit diagram depicting an exemplary portion of an XOR-MUX tree of the ALU of FIG. 6.

FIG. 8 is a circuit diagram depicting an exemplary portion of XOR-MUX tree 640. Sum S output 633 is provided to a second XOR column or level 811 of an overall XOR tree. Again, bitwise adder 631 effectively provides a first column or level of such XOR tree with output of S output 633 bits. In this example, from bottom to top, S output 633 bits S(0) through S(47) are provided sequentially in groups of six bits each respectively to XOR gates 811-1 through 811-8. Even though particular numerical examples are provided for purposes of clarity and not limitation, it should be understood that other values may be used, including without limitation other groupings of bits and/or bit widths, in other configurations.

Outputs of XOR gates 811-1 through 811-8 respectively are XOR outputs 801-1 through 801-8, which are collectively referred to as "XOR12" signals 801. Because initial XORing is provided with bitwise adder 631 on 12 bits per branch for XOR-MUX tree 640, output of an XOR gate 811 represents two levels of XORing of 12 bits to produce a single bit. For this example, it is assumed that two-input XORing is performed by bitwise adder 631 for purposes of clarity by way of example and not limitation. This second level of XORing provided with XOR gates 811 is provided separately from logic operation circuitry of ALU 262. XOR outputs 801-1 through 801-8 may be tapped to provide respective single bit inputs to 2-to-1 multiplexers for Single Instruction Multiple Data ("SIMD") operation, as described below in additional detail.

XOR outputs 801-1 through 801-8 are sequentially provided in respective pairs as inputs to XOR gates 812-1 through 812-4 of a third XOR column or level 812. Output of XOR gates 812-1 through 812-4 respectively are XOR outputs 802-1 through 802-4, which are collectively referred to as "XOR24" signals 802 to indicate an XORing of two XOR12s of a same branch. Again, XOR outputs 802-1 through 802-4 may be tapped to provide respective single bit inputs to 2-to-1 multiplexers for SIMD operation, as described below in additional detail.

XOR outputs 802-1 through 802-4 are sequentially provided in respective pairs as inputs to XOR gates 813-1 through 813-2 of a fourth XOR column or level 813. Output of XOR gates 813-1 through 813-2 respectively are XOR outputs 803-1 and 803-2, which are collectively referred to as "XOR48" signals 803 to indicate an XORing of two XOR24s of a same branch. Again, XOR outputs 803-1 and 803-2 may be tapped to provide respective single bit inputs to 2-to-1 multiplexers for SIMD operation, as described below in additional detail.

Lastly, XOR outputs 803-1 and 803-2 are provided as a respective input pair to XOR gate 814 of a fifth XOR column or level. Output of XOR gate 814 is XOR output 804, which is referred to as "XOR96" signal 804 to indicate an XORing of two XOR48s feeding such final XOR gate 804.

By adding in XOR tree portion of XOR-MUX tree 640 to an ALU, such XOR tree portion may be used for Ethernet Media Access Control ("EMAC"), and cyclic redundancy coding ("CRC"), among other types of applications for wide XOR trees. Along those lines, increased efficiency for EMAC CRC and/or Error Correction Code ("ECC") applications may be provided with wide XOR trees using one or more DSP slices 200. Furthermore, XORing in configurable or programmable hard macro DSP slices 200 has significant performance advantages over doing same using programmable fabric resources.

Figure 9:
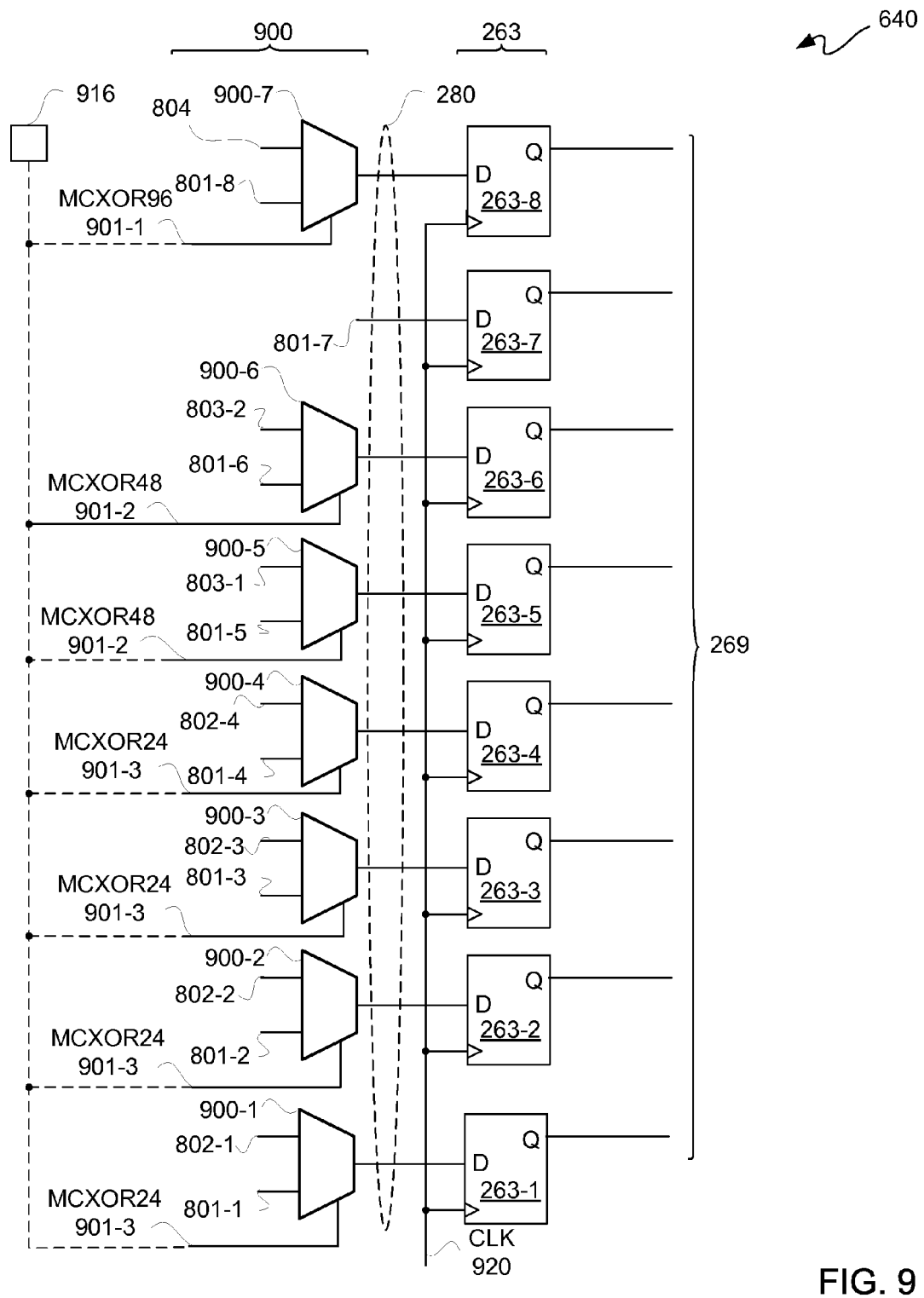
FIG. 9 is a block/circuit diagram depicting another exemplary portion of XOR-MUX of the ALU of FIG. 6 to provide XOR/SIMD output.

FIG. 9 is a block/circuit diagram depicting another exemplary portion of XOR-MUX tree 640 coupled to output registers 263 to provide XOR/SIMD output 269. Again, even though particular numerical examples are provided for purposes of clarity and not limitation, these or other numerical examples may be used in other configurations. With simultaneous reference to FIGS. 1 through 9, such other exemplary portion of XOR-MUX tree 640 is further described.

A multiplexer block 900, which may be used for SIMD, may be coupled to taps of an XOR tree of FIG. 8, as described below in additional detail. Multiplexer block 900 includes multiplexers 900-1 through 900-7. As there are 15 taps on XOR tree of FIG. 8, XOR 12 output 801-7 may be directly provided to a data input of output register 263-7.

Multiplexers 900-1 through 900-7 may have their respective control select signals provided by programming configuration memory cells. Along those lines, all of multiplexers 900-1 through 900-7 optionally may be controlled with a single configuration memory cell 916, or multiple configuration memory cells 916 may be used to individually provide the different select signals described herein for the various XORm-bit configurations. With respect to the latter, a configuration memory cell XOR96 select signal 901-1 may be provided as a control select signal to multiplexer 900-7. A configuration memory cell XOR48 select signal 901-2 may be provided as a control select signal to multiplexers 900-5 and 900-6. A configuration memory cell XOR24 select signal 901-3 may be provided as a control select signal to multiplexers 900-1 through 900-4.

XOR96 output 804 and XOR12 output 801-8 are provided as inputs to multiplexer 900-7 from which is selected an output for input to output register 263-8. XOR48 output 803-2 and XOR12 output 801-6 are provided as inputs to multiplexer 900-6 from which is selected an output for input to output register 263-6. XOR48 output 803-1 and XOR12 output 801-5 are provided as inputs to multiplexer 900-5 from which is selected an output for input to output register 263-5. XOR24 output 802-4 and XOR12 output 801-4 are provided as inputs to multiplexer 900-4 from which is selected an output for input to output register 263-4. XOR24 output 802-3 and XOR12 output 801-3 are provided as inputs to multiplexer 900-3 from which is selected an output for input to output register 263-3. XOR24 output 802-2 and XOR12 output 801-2 are provided as inputs to multiplexer 900-2 from which is selected an output for input to output register 263-2. Lastly, XOR24 output 802-1 and XOR12 output 801-1 are provided as inputs to multiplexer 900-1 from which is selected an output for input to output register 263-1. Each of multiplexers 900 has two data inputs respectively coupled to two output taps at different levels of the XOR tree of FIG. 8.

Collectively, outputs from multiplexer block 900, as well as XOR12 output 801-7, provide output bus 280 for output registers 263. Output registers 263 may all be clocked responsive to a clock signal 920 for providing XOR/SIMD output 269. Each of output registers 263 may be an output register of DSP slice 200, as previously described, and each of multiplexers 900 may be internal to ALU 262. XOR-MUX tree 640 may be configurable to be either an octal XOR12 output, a quad XOR24 output, a dual XOR48 output, or a single XOR96 output. DSP slices 200 may be cascaded to provide wider XOR outputs too. For example, two DSP slices 200 may be cascaded to create an XOR192 output, namely 192 input bits which may be reduced down to a single XOR192 output bit. This allows for an increase in efficiency such as for Forward Error Correction ("FEC"), including without limitation EFEC and GFEC, due to SIMD granularity.

With respect to an FPGA implementation having multiple DSP slices 200, such a wide XOR capability may be used to maintain DSP to lookup table ("LUT") ratios in wired vs. wireless designs.

FIG. 10 is a table diagram depicting an exemplary arithmetic operations table 1000 for DSP slice 200 of FIG. 2. All columns are respectively identified by their associated signals as previously described herein, except for column 1001 which indicates preadder/multiplier functions provided by associated signal states of signals 202-0 through 202-4, 317, 395, 495, 344, and 444.

Figure 11:
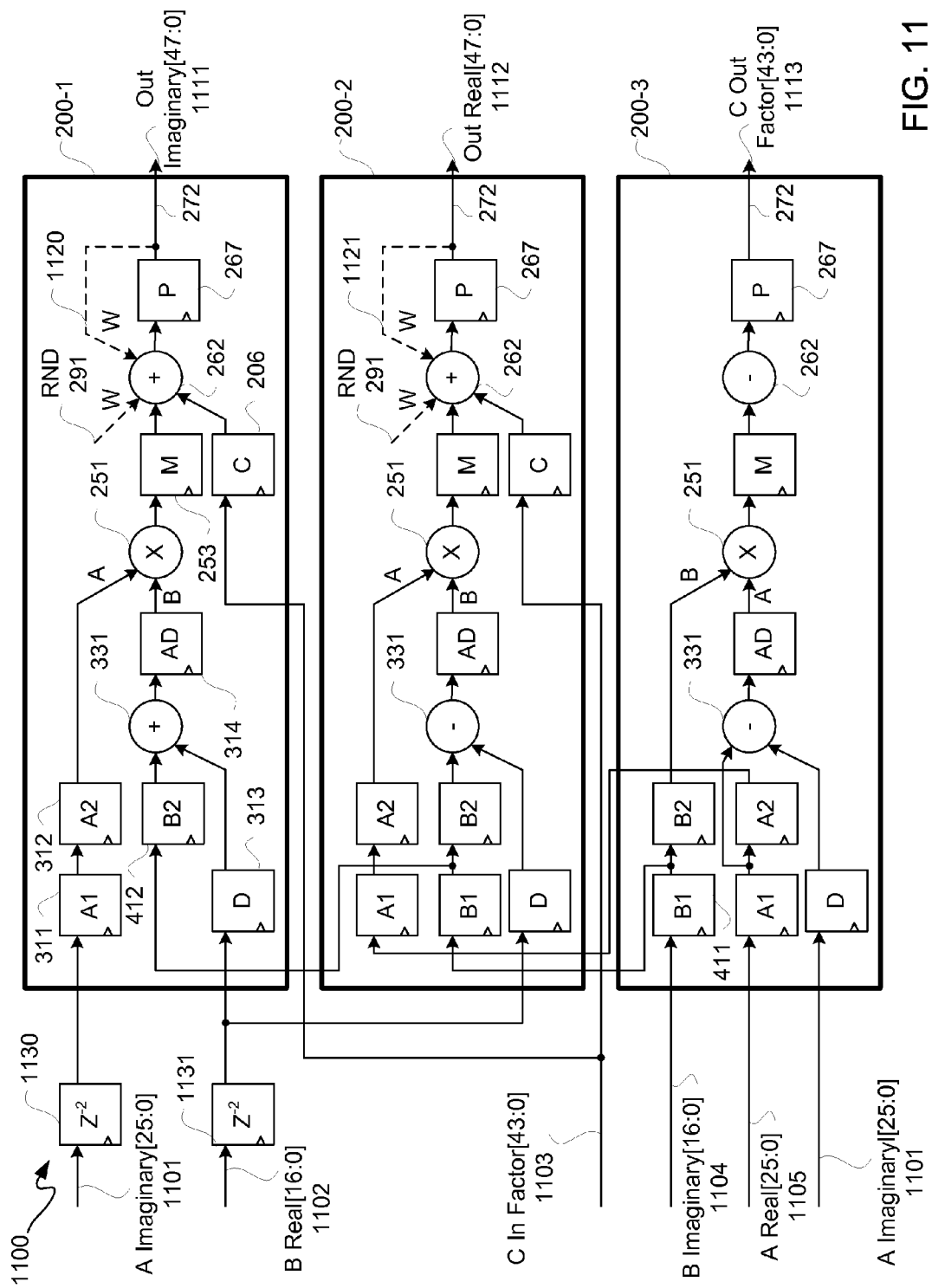
FIG. 11 is a block diagram depicting an exemplary set of DSP slices configured to provide a multiply-accumulate function.

FIG. 11 is a block diagram depicting an exemplary set of DSP slices 1100. Set of DSP slices 1100 include a DSP slice 200-1, a DSP slice 200-2, and a DSP slice 200-3. For purposes of clarity and not limitation, DSP slices 200-1 through 200-3 are simplified versions of DSP slice 200 of FIG. 2. Set of DSP slices 1100 is configured as a 26×17 complex multiply accumulator with round constant input over multiple clock cycles. Along those lines, on a clock cycle, a round constant 291 is input to ALU 262 via an input W multiplexer respectively of DSP slices 200-1 and 200-2, as generally indicated with RND 291 dashed lines, and, on a subsequent clock cycle, a product P output 272 is fed back to ALU 262 via such input W multiplexer respectively of DSP slices 200-1 and 200-2, as generally indicated with dashed lines 1120 and 1121. Thus, either a round constant 291 or a product P 272 is input to a respective ALU 262 of DSP slices 200-1 and 200-2. By feeding back a product P output 272 to ALU 262, a single DSP slice 200 may function as an accumulator.

For purposes of clarity by way of example and not limitation, a complex multiply for the following Equations is described:

$$(A\_re[25:0]+jA\_im[25:0])\times(B\_re[16:0]+jB\_im[16:0])=\text{Out}\_re[43:0]+j\text{Out}\_im[43:0]; \quad (1)$$

$$\text{Out}\_re[43:0]=((A\_re[25:0]\times B\_re[16:0])-(A\_im[25:0]\times B\_im[16:0])); \text{ and} \quad (2)$$

$$\text{Out}\_im[43:0]=((A\_re[25:0]\times B\_im[16:0])+(A\_im[25:0]\times B\_re[16:0])). \quad (3)$$

Using three DSP slices with preadders, such Equations (2) and (3) may be re-factored as indicated in the following Equations:

$$\text{Out}\_re[43:0]=((A\_re[25:0]-A\_im[25:0])\times B\_im[16:0])+((B\_re[16:0]-B\_im[16:0])\times A\_re[25:0]); \text{ and} \quad (4)$$

$$\text{Out}\_im[43:0]=((A\_re[25:0]-A\_im[25:0])\times B\_im[16:0])+((B\_re[16:0]+B\_im[16:0])\times A\_im[25:0]). \quad (5)$$

A common factor that is shared in Equations (4) and (5) is:

$$((A\_re[25:0]-A\_im[25:0])\times B\_im[16:0]). \quad (6)$$

With Equations (1) through (6) borne in mind, set of DSP slices 1100 is further described. To extend the description below to a complex multiply accumulate, a time parameter may be added to output real and output imaginary so that N and N+1 indexes are added together recursively, and bit width is allowed to grow to a 47:0 type size for example.

A common input factor 1103 is provided to C registers 206 of DSP slices 200-1 and 200-2. An imaginary portion of an A variable is provided as A imaginary input 1101 to a two clock cycle delay register file 1130 and to D register 313 of DSP slice 200-3, where such register file may be provided using programmable fabric resources. A real portion of such A variable is provided as A real input 1105 to A1 register 311 of DSP slice 200-3. A real portion of a B variable is provided as B real input 1102 to a two clock cycle delay register file 1131, where such register file may be provided using programmable fabric resources. An imaginary portion of a B variable is provided as B imaginary input 1104 to B1 register 411 of DSP slice 200-3.

Output of register file 1130 is provided to register A1 register 311 of DSP slice 200-1. Output of register file 1131 is provided to D registers 313 of DSP slices 200-1 and 200-2.

With reference to DSP slice 200-3, output of B1 register 411 is provided to B2 register 412, as well as to B1 register 411 of DSP slice 200-2. Output of A1 register 311 is provided to A2 register 312 and to subtractor 331, and output of D register 313 is likewise provided as an input to subtractor 331 for a subtraction operation. Output of A2 register 312 is provided to A1 register 311 of DSP slice 200-2. Output of subtractor 311 is provided to AD register 314. Output of AD register 314 is provided along path A to multiplier 251 for multiplication with output from B2 register 412 provided along path B. Output of multiplier 251 is provided to M register 253, and output of M register 253 is provided to ALU 262 for subtraction. Output of ALU 262 is provided to output P register 267 for output as a P product output 272, which is a common C output factor 1113 having a 44-bit width. Common C output factor 1113 happens to be the same signal as common C input factor 1103.

With reference to DSP slice 200-2, output of A1 register 311 is provided to A2 register 312. Output of B1 register 411 is provided to B2 register 412, as well as to B2 register 412 of DSP slice 200-1. Output of B2 register 412 is provided as an input to subtractor 331 for a subtraction operation. Output of D register 313 is likewise provided as an input to subtractor 331 for a subtraction operation. Output of subtractor 331 is provided to AD register 314. Output of AD register 314 is provided along path B to multiplier 251 for multiplication with output from A2 register 312 provided along path A. Output of multiplier 251 is provided to M register 253, and output of M register 253 is provided to ALU 262 for addition with an output from C register 206 and a round constant 291 from input W multiplexer 254 on a clock cycle. Output of ALU 262 is provided to output P register 267 for output as a P product output 272, which is a real portion output 1112 having a 48-bit width. Such real portion output 1112 on a subsequent clock cycle is fed back, as generally indicated by dashed line 1121, to input W multiplexer 254 for providing to ALU 262 for an addition accumulation operation.

With reference to DSP slice 200-1, output of A1 register 311 is provided to A2 register 312. Output of B2 register 412 is provided as an input to adder 331 for an addition operation with output of D register 313. Output of AD register 314 is provided along path B to multiplier 251 for multiplication with output from A2 register 312 provided along path A. Output of multiplier 251 is provided to M register 253, and output of M register 253 is provided to ALU 262 for addition with an output from C register 206 and a round constant 291 from input W multiplexer 254 on a clock cycle. Output of ALU 262 is provided to output P register 267 for output as a P product output 272, which is an imaginary portion output 1111 having a 48-bit width. Such imaginary portion output 1111 on a subsequent clock cycle is fed back, as generally indicated by dashed line 1120, to input W multiplexer 254 for providing to ALU 262 for an accumulation operation.

By using A and/or B cascaded inputs, shift register logic may be reduced. Additionally, as previously described, a multiply accumulate capability of the DSP slice provides additional functionality, which may be performed independently of programmable fabric resources. Furthermore, a preadder may be sourced from a B register or an A register. Moreover, (A_re−A_im) may be created by starting with (A_im−A_re) and using a post adder to provide a negation of x, namely x(−1), function. Therefore, A_re may be on an A port instead of a D port to start an A cascade on the bottom of a DSP slice 200. A C port in an upper DSP slice 200 may be used to eliminate an adder instantiated in programmable fabric resources in instances when a complex multiplier is extended from a 27×18 to a 27×19. In addition to a complex multiply accumulator with a 48-bit accumulation using input W multiplexer 254 for inclusion of a round constant and accumulation feedback, a 96-bit accumulation may be provided. For a 96-bit accumulation, both lower multiplications are sign extended. Furthermore, for larger multipliers, such as 54×54 or larger, a reduction in DSP slices may be provided using DSP slices 200. Along those lines, DSP slices 200 allow for a C port to be usable when a P cascade input port is also being used.

While the foregoing describes exemplary embodiments, other and further embodiments in accordance with the one or more aspects may be devised without departing from the scope thereof, which is determined by the claims that follow and equivalents thereof. Claims listing steps do not imply any order of the steps. Trademarks are the property of their respective owners.

What is claimed is:
1. An integrated circuit, comprising:
a first digital signal processing ("DSP") block having an input interface for receiving a first operand input, a second operand input, a third operand input, and a fourth operand input;
wherein the first DSP block comprises:
  a preadder-register block coupled to receive the first operand input, the second operand input, and the fourth operand input;
  a multiplier coupled to the preadder-register block to receive a multiplicand operand and a multiplier operand therefrom;
  a first register block coupled to the multiplier to receive a first set of partial products and a second set of partial products from the multiplier;
  a second register block coupled to receive the third operand input;
  an arithmetic logic unit ("ALU") block coupled to the pre-adder-register block, the first register block and the second register block;
wherein the ALU block comprises:
  a first multiplexer coupled to receive the third operand input from the second register block and a feedback product input from a product output of the ALU block;
  a second multiplexer coupled to receive the first set of partial products and the product input fed back;
  a third multiplexer coupled to receive the second set of partial products and the third operand input from the second register block;
  a fourth multiplexer coupled to receive the product input fed back and the third operand input from the second register block; and
  an ALU coupled to receive outputs from each of the first multiplexer, the second multiplexer, the third multiplexer, and the fourth multiplexer;
wherein the ALU block includes an XOR tree;
wherein the XOR tree comprises:
  a first level of XOR gates provided from logic operation circuitry of the ALU;

a second level of XOR gates higher than the first level of XOR gates coupled to outputs of the first level of XOR gates;
wherein the second level of XOR gates is provided separately from the logic operation circuitry of the ALU;
a third level of XOR gates higher than the second level of XOR gates coupled to outputs of the second level of XOR gates; and
an XOR gate higher than the third level of XOR gates coupled to outputs of the third level of XOR gates;
a plurality of output registers;
wherein a first portion of the plurality of output registers is respectively coupled to outputs of the plurality of multiplexers; and
wherein a second portion of the plurality of output registers is coupled to an output tap of the output taps of the XOR tree.

2. The integrated circuit according to claim 1, wherein the ALU of the ALU block includes the XOR tree.

3. The integrated circuit according to claim 2, wherein the ALU block is configured to dynamically provide either a product output or an XOR output at a time.

4. The integrated circuit according to claim 2, wherein the ALU block further includes a Single Instruction Multiple Data ("SIMD") block coupled to the XOR tree.

5. The integrated circuit according to claim 4, wherein the SIMD block comprises a plurality of multiplexers coupled to output taps of the XOR tree.

6. The integrated circuit according to claim 2, further comprising:
a second DSP block coupled to receive the product output of the ALU block of the first DSP block;
wherein the ALU of the ALU block of each of the first DSP block and the second DSP block includes a first XOR tree; and
wherein the first DSP block and the second DSP block are cascade coupled to one another to provide a second XOR tree which is a combination of the first XOR tree of each of the first DSP block and the second DSP block.

7. An integrated circuit, comprising:
a plurality of digital signal processing ("DSP") slices coupled to one another for performing multiplication of a first complex variable and a second complex variable;
wherein each of the DSP slices has an input interface for receiving a first operand input, a second operand input, a third operand input, and a fourth operand input;
wherein each of the DSP slices comprises:
a preadder-register block coupled to receive the first operand input, the second operand input, and the fourth operand input;
a multiplier coupled to the preadder-register block to receive a multiplicand operand and a multiplier operand therefrom;
a first register block coupled to the multiplier to receive a first set of partial products and a second set of partial products from the multiplier;
a second register block coupled to receive the third operand input;
an arithmetic logic unit ("ALU") block coupled to the pre-adder-register block, the first register block and the second register block;
wherein the ALU block comprises:
a first multiplexer coupled to receive the third operand input from the second register block and a feedback product input from a product output of the ALU block;
a second multiplexer coupled to receive the first set of partial products and the product input fed back;
a third multiplexer coupled to receive the second set of partial products and the third operand input from the second register block;
a fourth multiplexer coupled to receive the product input fed back and the third operand input from the second register block; and
an ALU coupled to receive outputs from each of the first multiplexer, the second multiplexer, the third multiplexer, and the fourth multiplexer;
wherein the ALU block includes an XOR tree;
wherein the XOR tree comprises:
a first level of XOR gates provided from logic operation circuitry of the ALU;
a second level of XOR gates higher than the first level of XOR gates coupled to outputs of the first level of XOR gates;
wherein the second level of XOR gates is provided separately from the logic operation circuitry of the ALU;
a third level of XOR gates higher than the second level of XOR gates coupled to outputs of the second level of XOR gates; and
an XOR gate higher than the third level of XOR gates coupled to outputs of the third level of XOR gates;
a plurality of output registers;
wherein a first portion of the plurality of output registers is respectively coupled to outputs of the plurality of multiplexers; and
wherein a second portion of the plurality of output registers is coupled to an output tap of the output taps of the XOR tree.

8. The integrated circuit according to claim 7, wherein the fourth multiplexer is coupled to receive a round constant for input to the ALU.

9. The integrated circuit according to claim 7, wherein:
the fourth multiplexer is coupled to receive a round constant for input to the ALU;
each of the DSP slices includes the fourth multiplexer coupled to receive the product input fed back to provide an accumulator function; and
the fourth multiplexer is dynamically selectable to provide either the round constant or the product input feedback.

* * * * *